United States Patent
Chennimalai et al.

(10) Patent No.: US 9,721,222 B2
(45) Date of Patent: Aug. 1, 2017

(54) SYSTEM AND METHOD OF PARALLELIZING ORDER-BY-ORDER PLANNING

(75) Inventors: Gayathri Chennimalai, Bangalore (IN); Jayan Moorkanat, Bangalore (IN); Srinivasulu Reddy, Bangalore (IN); Bhanu Gotluru, Bangalore (IN)

(73) Assignee: JDA Software Group, Inc., Scottsdale, AZ (US)

( * ) Notice: Subject to any disclaimer, the term of this patent is extended or adjusted under 35 U.S.C. 154(b) by 939 days.

(21) Appl. No.: 12/610,548

(22) Filed: Nov. 2, 2009

(65) Prior Publication Data

US 2010/0114640 A1   May 6, 2010

Related U.S. Application Data

(60) Provisional application No. 61/111,219, filed on Nov. 4, 2008.

(51) Int. Cl.
  *G06Q 10/06* (2012.01)
  *G06Q 10/08* (2012.01)

(52) U.S. Cl.
  CPC ............ *G06Q 10/08* (2013.01); *G06Q 10/06* (2013.01); *G06Q 10/06315* (2013.01); *G06Q 10/087* (2013.01)

(58) Field of Classification Search
  None
  See application file for complete search history.

(56) References Cited

U.S. PATENT DOCUMENTS 6,349,237 B1 * 2/2002 Koren et al. .................... 700/96
7,130,807 B1 * 10/2006 Mikurak ..................... 705/7.25
(Continued)

FOREIGN PATENT DOCUMENTS

TW   200705290   2/2007
TW   200725452   7/2007

OTHER PUBLICATIONS

Lin et al. "Reengineering the order fulfillment process in supply chain networks", The International Journal of Flexible Manufacturing Systems, 10 (1998): pp. 197-229.*
(Continued)

*Primary Examiner* — Thomas L Mansfield, Jr.
(74) *Attorney, Agent, or Firm* — Jackson White, PC; Steven J. Laureanti

(57) ABSTRACT

A system and method is disclosed for parallelizing order-by-order planning in a supply chain network. The system includes a database configured to store data describing a demand priority sequence, each demand priority sequence comprising at least one demand of an end-item and data describing the supply chain network comprising a plurality of network components, each network component configured to supply one or more items to satisfy demand. The system further includes a server coupled with the database, the server accesses the data describing the demand priority sequence and accesses the data describing the supply chain network. The server further creates mapping tables for each end-item, generates a dependency map for each end-item, generates a list of demand levels, and generates an order plan of end-items for planning in parallel comprising the orders planned for the demands at each demand level.

18 Claims, 3 Drawing Sheets

(56) References Cited

U.S. PATENT DOCUMENTS

| | | | |
|---|---|---|---|
| 7,725,366 B1* | 5/2010 | Franco | G06Q 10/08 705/27.1 |
| 7,822,792 B2* | 10/2010 | Reusch | G06F 17/30348 705/28 |
| 8,126,755 B2* | 2/2012 | Hessedenz | G06Q 10/063 705/28 |
| 8,402,426 B2* | 3/2013 | Alfandary et al. | 717/102 |
| 8,725,594 B1* | 5/2014 | Davies et al. | 705/28 |
| 2002/0120459 A1* | 8/2002 | Dick | G06Q 10/06316 705/7.26 |
| 2002/0138314 A1* | 9/2002 | Brown | G06F 17/289 |
| 2003/0061081 A1* | 3/2003 | Kellond | G06Q 10/06 705/7.12 |
| 2005/0223109 A1* | 10/2005 | Mamou et al. | 709/232 |
| 2006/0143062 A1* | 6/2006 | Booss et al. | 705/8 |
| 2009/0172014 A1* | 7/2009 | Huetter | 707/103 R |

OTHER PUBLICATIONS

Search Report for Taiwan Invention Patent Application No. 098137477; Jul. 16, 2014; p. 1.

* cited by examiner

SYSTEM AND METHOD OF PARALLELIZING ORDER-BY-ORDER PLANNING

CROSS-REFERENCE TO RELATED APPLICATIONS

The present invention is related to that disclosed in U.S. Provisional Patent Application Ser. No. 61/111,219, filed 4 Nov. 2008, entitled "Parallelizing Order-By-Order Planning to Improve Performance." U.S. Provisional Patent Application Ser. No. 61/111,219 is assigned to the assignee of the present application. The subject matter disclosed in U.S. Provisional Patent Application Ser. No. 61/111,219 is hereby incorporated by reference into the present disclosure as if fully set forth herein. The present invention hereby claims priority under 35 U.S.C. §119(e) to U.S. Provisional Patent Application Ser. No. 61/111,219.

TECHNICAL FIELD OF THE INVENTION

This invention relates generally to order planning, and more particularly to generating an order plan of end-items to be planned in parallel.

BACKGROUND OF THE INVENTION

In a supply chain network, orders may be planned to satisfy demand received from one or more customers for an item. These demands may have different demand priorities. For example, a demand for one item may have a higher priority than a demand for another item, because of, for example, material or capacity constraints. Traditional master planning uses, for example, an order-by-order solver, such that, each order is planned one after another in the order of the demand priority. However, because most supply chains are huge, the overall planning time is considerable. The inability to provide a master planning run to improve the overall planning time is undesirable.

SUMMARY OF THE INVENTION

A system for parallelizing order-by-order planning in a supply chain network is disclosed. The system includes a database configured to store data describing a demand priority sequence, each demand priority sequence comprising at least one demand of an end-item and data describing the supply chain network comprising a plurality of network components, each network component configured to supply one or more items to satisfy demand. The system further includes a server coupled with the database; the server accesses the data describing the demand priority sequence and accesses the data describing the supply chain network. The server further creates mapping tables for each end-item, generates a dependency map for each end-item, generates a list of demand levels, and generates an order plan of end-items for planning in parallel comprising the orders planned for the demands at each demand level.

A method of parallelizing order-by-order planning in a supply chain network is also disclosed. The method provides for accessing data describing a demand priority sequence, each demand priority sequence comprising at least one demand of an end-item and accessing data describing the supply chain network comprising a plurality of network components, each network component configured to supply one or more items to satisfy demand. The method further provides for creating mapping tables for each end-item, generating a dependency map for each end-item, generating a list of demand levels, and generating an order plan of end-items for planning in parallel comprising the orders planned for the demands at each demand level.

A computer-readable medium embodied with software enabling parallelizing order-by-order planning in a supply chain network is also disclosed. The software is configured to access data describing a demand priority sequence, each demand priority sequence comprising at least one demand of an end-item and access data describing the supply chain network comprising a plurality of network components, each network component configured to supply one or more items to satisfy demand. The software is further configured to create mapping tables for each end-item, generate a dependency map for each end-item, generate a list of demand levels, and generate an order plan of end-items for planning in parallel comprising the orders planned for the demands at each demand level.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
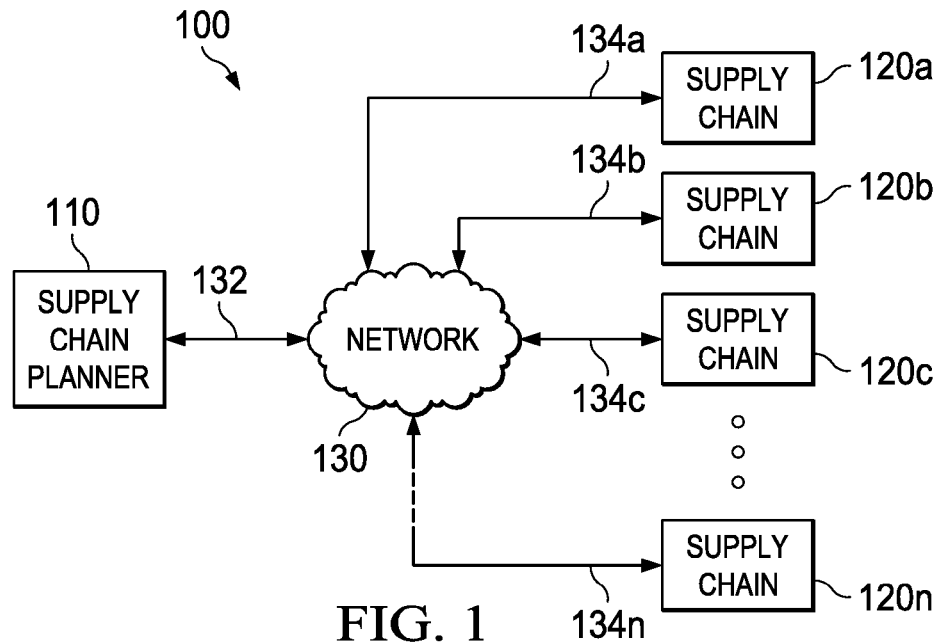
FIG. 1 illustrates an exemplary system according to a preferred embodiment.

FIG. 1 illustrates an exemplary system 100 according to a preferred embodiment. System 100 comprises a supply chain planner 110, one or more supply chains 120a-120n, a network 130, and communication links 132 and 134a-134n. Although a single supply chain planner 110, one or more supply chains 120a-120n, and a single network 130, are shown and described; embodiments contemplate any number of supply chain planners, any number of supply chains, and/or any number of networks, according to particular needs. In addition, or as an alternative, supply chain planner 110 may be integral to or separate from the hardware and/or software of any one of the one or more supply chains 120a-120n. In addition, as discussed below, embodiments of the present invention provide for optimizing the performance and planning time of supply chains 120a-120n by planning orders in parallel without violating the demand priority sequence.

In one embodiment, one or more supply chains 120a-120n represent one or more supply chain networks including one or more entities, such as, for example suppliers, manufacturers, distribution centers, retailers, and/or customers. A supplier may be any suitable entity that offers to sell or otherwise provides one or more items (i.e., materials, components, or products) to one or more manufacturers. A manufacturer may be any suitable entity that manufactures at least one end-item. A manufacturer may use one or more items during the manufacturing process to produce an end-item. In this document, the phrase "end-item" may refer to any manufactured, fabricated, assembled, or otherwise processed item, material, component, or product. An end-item may represent an item ready to be supplied to, for example, another supply chain entity in system 100, such as a supplier, an item that needs further processing, or any other item. A manufacturer may, for example, produce and sell an end-item to a supplier, another manufacturer, a distribution center, a retailer, a customer, or any other suitable person or entity. A distribution center may be any suitable entity that offers to sell or otherwise distributes at least one end-item to one or more retailers and/or customers. A retailer may be any suitable entity that obtains one or more end-items to sell to one or more customers.

Although one or more supply chains 120a-120n are shown and described as separate and independent supply chains, one or more end-items of each supply chain 120a-120n may share or link one or more resources and/or items, as discussed in more detail below. In addition, or as an alternative, although supply chains 120a-120n are described as separate and distinct entities, the same person or entity can simultaneously act as any one of supply chains 120a-120n. For example, one or more supply chains 120a-120n acting as a manufacturer could produce an end-item, and the same entity could act as a supplier to supply an item to another supply chain. Although one example of a supply chain is shown and described, embodiments contemplate any operational environment and/or supply chain, without departing from the scope of the present invention.

In one embodiment, supply chain planner 110 is coupled with network 130 using communications link 132, which may be any wireline, wireless, or other link suitable to support data communications between supply chain planner 110 and network 130 during operation of system 100. One or more supply chains 120a-120n are coupled with network 130 using communications links 134a-134n, which may be any wireline, wireless, or other link suitable to support data communications between one or more supply chains 120a-120n and network 130 during operation of system 100. Although communication links 132 and 134a-134n are shown as generally coupling supply chain planner 110 and one or more supply chains 120a-120n to network 130, supply chain planner 110 and one or more supply chains 120a-120n may communicate directly with each other, according to particular needs.

In another embodiment, network 130 includes the Internet and any appropriate local area networks (LANs), metropolitan area networks (MANS), or wide area networks (WANs) coupling supply chain planner 110 and one or more supply chains 120a-120n. For example, data may be maintained by supply chain planner 110 at one or more locations external to supply chain planner 110 and one or more supply chains 120a-120n and made available to one or more associated users of the one or more supply chains 120a-120n using network 130 or in any other appropriate manner. Those skilled in the art will recognize that the complete structure and operation of communication network 130 and other components within system 100 are not depicted or described. Embodiments may be employed in conjunction with known communications networks and other components.

Figure 2:
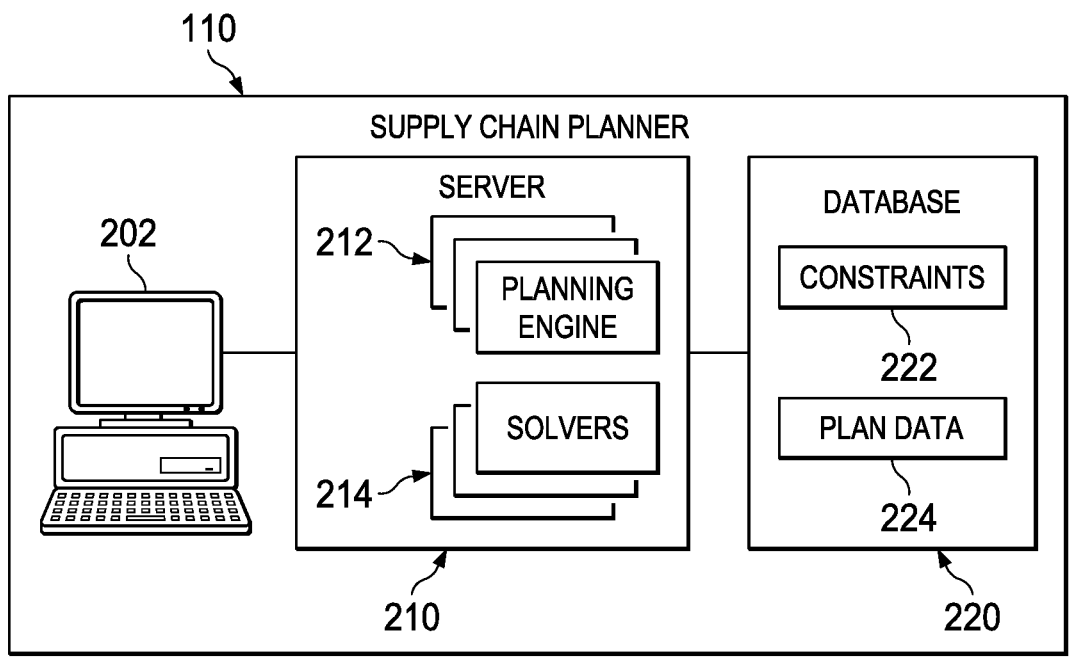
FIG. 2 illustrates the supply chain planner of FIG. 1 in greater detail in accordance with the preferred embodiment.

FIG. 2 illustrates supply chain planner 110 of FIG. 1 in greater detail in accordance with the preferred embodiment. Supply chain planner 110 comprises a computer 202, a server 210, and a database 220. Server 210 comprises one or more planning engines 212 and one or more solvers 214. Although server 210 is shown and described as comprising one or more planning engines 212 and one or more solvers 214, embodiments contemplate any suitable engine, solver, or combination of engines and/or solvers, according to particular needs.

Database 220 comprises one or more databases or other data storage arrangements at one or more locations, local to, or remote from, server 210. Database 220 may be coupled with server 210 using one or more local area networks (LANs), metropolitan area networks (MANs), wide area networks (WANs), network 130, such as, for example, the Internet, or any other appropriate wire line, wireless, or other links. Database 220 stores data that may be used by server 210. Database 220 includes, for example, constraints 222 and planning data 224. Although database 220 is shown and described as including constraints 222 and planning data 224, embodiments contemplate any suitable information or data, according to particular needs.

In one embodiment, supply chain planner 110 operates on one or more computers 202 that are integral to or separate from the hardware and/or software that support system 100. Computers 202 include any suitable input device, such as a keypad, mouse, touch screen, microphone, or other device to input information. An output device conveys information associated with the operation of supply chain planner 110 and one or more supply chains 120a-120n, including digital or analog data, visual information, or audio information. Computers 202 include fixed or removable computer-readable storage media, such as, for example, magnetic computer disks, CD-ROM, or other suitable media to receive output from and provide input to system 100. Computers 202 include one or more processors and associated memory to execute instructions and manipulate information according to the operation of system 100.

In one embodiment, the memory associated with one or more computers 202 comprises any of a variety of data structures, arrangements, and/or compilations configured to store and facilitate retrieval of information. The memory may, for example, comprise one or more volatile or non-volatile memory devices. Although the memory is described as residing within one or more computers 202, the memory may reside in any location or locations that are accessible by one or more computers 202 or the one or more processors. The memory receives and stores information related to order-by-order planning in one or more supply chains 120a-120n. The one or more processors processes information stored in the memory and generates an order plan that satisfies a demand priority sequence associated with one or more supply chains 120a-120n. The memory may store and the one or more processors may process any suitable information to perform supply chain order planning operations in system 100.

Although a single computer 202 is shown in FIG. 2, supply chain planner 110 and one or more supply chains 120a-120n may each operate on separate computers 202 or may operate on one or more shared computers 202. Each of these one or more computers 202 may be a work station, personal computer (PC), network computer, notebook computer, personal digital assistant (PDA), cell phone, telephone, wireless data port, or any other suitable computing device.

In an embodiment, one or more users may be associated with supply chain planner 110 and/or one or more supply chains 120a-120n. These one or more users may include, for example, a "planner" handling master planning, order planning and/or one or more related tasks within system 100. In addition, or as an alternative, these one or more users within system 100 may include, for example, one or more computers 202 programmed to autonomously handle master planning, order planning and/or one or more related tasks within system 100.

In one embodiment, server 210 supports one or more planning engines 212 which provide for order by order planning used to generate order plans based on inputs received from one or more planners and/or database 220, as described more fully below. Plan data 224, within database 220, includes data representing demands, demand priority sequence, and order plans. In addition, the order plans are generated by one or more planning engines 212 and may be used by planners within system 100, according to particular needs. Supply chain planner 110, and in particular, server 210, stores and/or accesses various rules and plan data associated with supply chains 120a-120n.

In addition, one or more solvers 214 include order-by-order solvers for generating an order plan of end-items to be planned in parallel. Although one or more solvers 214 is described as an order-by-order solver, one or more solvers 214 may include any suitable solver or combination of solvers, according to particular needs. In one embodiment, constraints 222 restrict the feasibility of order planning one or more end-items in parallel. As described more fully below, constraints 222 may be associated with one or more end-items of each supply chain 120a-120n, wherein each of the one or more end-items may share one or more resources and/or items and therefore, affect whether each end item is planned in parallel.

Figure 3:
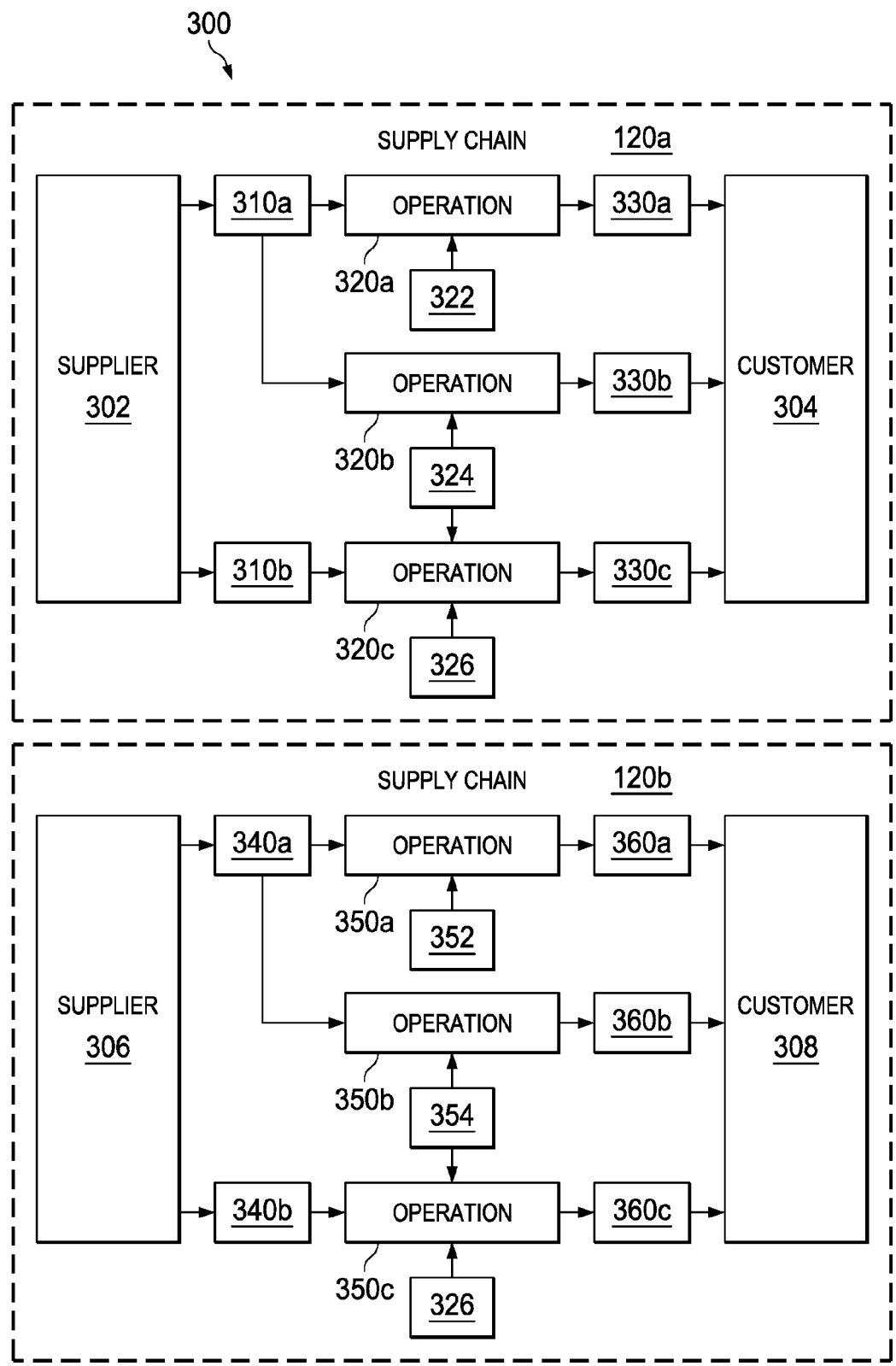
FIG. 3 illustrates supply chains of FIG. 1 in greater detail in accordance with an exemplary embodiment.

FIG. 3 illustrates supply chains 120a and 120b of FIG. 1 in greater detail in accordance with an exemplary embodiment. Supply chains 120a and 120b comprise suppliers 302 and 306, customers 304 and 308, items 310a, 310b, 340a, and 340b, operations 320a-320c and 350a-350c, resources 322, 324, 326, 352, and 354, and end-items 330a-330c and 360a-360c. Although supply chain network 120 is shown and described as comprising various supply chain entities, buffers and paths, embodiments contemplate any suitable supply chain entities, buffers, paths or combination of entities, buffers and paths, according to particular needs.

In one embodiment, operations 320a-320c and 350a-350c represent one or more entities, structures, buffers, or apparatuses configured to receive one or more items, materials, components, or products from items 310a, 310b, 340a, and 340b and perform at least one operation to transform items into one or more end-items, stored in, for example, end-item buffers. In a particular embodiment, suppliers 302 and 306 provide items 310a, 310b, 340a, and 340b to operations 320a-320c and 350a-350c, and operations 320a-320c and 350a-350c produce end-items 330a-330c and 360a-360c, stored in, for example, an end-item buffer or entity using operations 320a-320c and 350a-350c and resources 322, 324, 326, 352, and 354.

To further explain the operation of generating an order plan of end-items to be planned in parallel, an example is now given. In the following example, end-items 330a-330c and 360a-360c are available to satisfy orders (i.e., demand) of customers 304 and 308. Although a particular number of end-items are shown and described, embodiments contemplate any number of end-items, according to particular needs. In addition, as discussed above, one or more end-items may share or link one or more resources and/or items, according to particular needs.

As discussed above and illustrated in FIG. 3, items are supplied by supplier 302 and 306 and stored in item buffers of supply chains 120a and 120b. In addition, end-items are produced using operations 320a-320c and 350a-350c which consume resources 322, 324, 326, 352, and 354 and/or items 310a, 310b, 340a, and 340b, as appropriate. In FIG. 3 end-item 330a of supply chain 120a is linked with end-item 330b of supply chain 120a by item 310a. End-item 330b of supply chain 120a is linked with end-item 330c of supply chain 120a by resource 324. End-item 360a of supply chain 120b is linked with end-item 360b of supply chain 120b by item 340a. End-item 360b of supply chain 120b is linked with end-item 360c of supply chain 120b by resource 354.

In addition, end-item 330c of supply chain 120a is linked with end-item 360c of supply chain 120b by resource 326. Therefore, supply chains 120a and 120b are tied together by resource 326 which is shared by end-item 330c and end-item 360c. Although, particular supply chains and end-items are shown and described as sharing one or more resources and/or items, embodiments contemplate any number of supply chains and end-items sharing any number of resources and items or any combination of resources and items, without departing from the scope of the present invention.

Continuing with this example, supply chain planner 110 receives demands from, for example, one or more supply chain entities in system 100 and selects, in this example, the following demand priority sequence: demand for end-item 330a; demand for end-item 330b; demand for end-item 330c; demand for end-item 360a; demand for end-item 360b; and finally demand for end-item 360c. Although a particular demand priority sequence is shown and described with this example, embodiments contemplate any demand priority sequence according to particular needs. In addition, or as an alternative, supply chain planner 110 plans parallel order plans for received demands without violating the demand priority sequence.

In one embodiment, supply chain planner 110 creates mapping tables in order to map each end-item, items and resources. For example, supply chain planner 110 creates a first mapping table mapping1 which maps each end-item to its corresponding item and resource mapping and a second mapping table mapping2 which maps each item and resource to its end-item mapping. That is, for each end-item, supply chain planner 110 accesses all items and resources in its corresponding supply path and updates mapping1 table. In addition, for each item and resource, supply chain planner 110 accesses all end-items in its corresponding supply path and updates mapping2 table.

In one embodiment, supply chain planner 110 creates a dependency map between each end-item based on mapping1 and mapping2 tables as follows:

For each end-item: X, get the list of items and resources from mapping1 table
    For every item and resource in this list, get their corresponding end-items list from mapping2 table
        In dependency map, for each end-item: X, add the above end-items lists as the related end-items
Repeat for each end-item in a given supply chain In this example, supply chain planner 110 creates a dependency map between end-items 330*a*-330*c* and 360*a*-360*c*, such that the dependency map is as follows (end time→related end-items):

end-item 330*a*→end-item 330*a*, end-item 330*b*
end-item 330*b*→end-item 330*a*, end-item 330*b*, end-item 330*c*
end-item 330*c*→end-item 330*b*, end-item 330*c*, end-item 360*c*
end-item 360*a*→end-item 360*a*, end-item 360*b*
end-item 360*b*→end-item 360*a*, end-item 360*b*, end-item 360*c*
end-item 360*c*→end-item 330*c*, end-item 360*b*, end-item 360*c*

Although, a particular dependency map is shown and described with the mapping tables of the above example, embodiments contemplate creating a dependency map associated with any mapping tables or combination of mapping tables, according to particular needs.

In one embodiment, one or more solvers 214 sorts the received demands based on the demand priority sequence and generates an order plan of end-items to be planned in parallel based on the received demands in order to satisfy the demand priority sequence. That is, for each received demand, one or more solvers 214:

1. Computes the demand level
2. Moves the demand to levelized_demand_list[level]
3. Updates the end-item with the level number One or more solvers 214 computes the demand level, as follows:

For each demand, get the demand's end-item
For the end-item, get end-item's related end-items from the generated dependency map
The demand's level=max (related end-items level)+1

In addition, one or more solvers 214 initializes each end-item with a demand level equal to −1. To further explain how one or more solvers 214 computes the demand level, an example is now given. In the following example, the demand level for each end-item is computed, while maintaining the demand priority sequence.

The demand level for end-item 330*a* is computed as follows:

$$\text{Level}=\max(\text{related end-items level})+1=\max(-1,-1)+1=-1\pm1=0$$

Update end-item 330*a* level=0 levelized_demand_list[0]=Demand for end-item 330*a*

The demand level for end-item 330*b* is computed as follows:

$$\text{Level}=\max(0,-1,-1)+1=0\pm1=1$$

Update end-item 330*b* level=1 levelized_demand_list[1]=Demand for end-item 330*b*

The demand level for end-item 330*c* is computed as follows:

$$\text{Level}=\max(1,-1,-1)+1=1+1=2$$

Update end-item 330*c* level=2 levelized_demand_list[2]=Demand for end-item 330*c*

The demand level for end-item 360*a* is computed as follows:

$$\text{Level}=\max(-1,-1)+1=-1+1=0$$

Update end-item 360*a* level=0 levelized_demand_list[0]=Demand for end-item 330*a*, Demand for end-item 360*a*

The demand level for end-item 360*b* is computed as follows:

$$\text{Level}=\max(0,-1,-1)+1=0+1=1$$

Update end-item 360*b* level=1 levelized_demand_list[1]=Demand for end-item 330*b*, Demand for end-item 360*b*

The demand level for end-item 360*c* is computed as follows:

$$\text{Level}=\max(2,1,-1)+1=2+1=3$$

Update end-item 360*c* level=3 levelized_demand_list[3]=Demand for end-item 360*c*

Therefore, in this example, one or more solvers 214 computes the parallel processing demand levels, as follows:

Level 0: Demand for end-item 330*a*, Demand for end-item 360*a*
Level 1: Demand for end-item 330*b*, Demand for end-item 360*b*
Level 2: Demand for end-item 330*c*
Level 3: Demand for end-item 360*c*

In addition, or as an alternative, once the parallel processing demand levels are computed, supply chain planner 110 sends the demand levels to a thread pool. Such that, for example, once Level0 demands are completed, Level1 demands are sent for parallel processing and so on.

In another embodiment, end-items 330*a*-330*c* and 360*a*-360*c* may be shared or linked by an item of infinite quantity which may be modeled as multiple infinite items for each of the respective end-items. In addition, to avoid bloating of the modeling size or to get the aggregated item requirements, a single infinite item may be modeled. In this case, supply chain planner 110 excludes the related end-items of infinite material, while creating dependency map, which further reduces the number of parallel processing levels.

Figure 4:
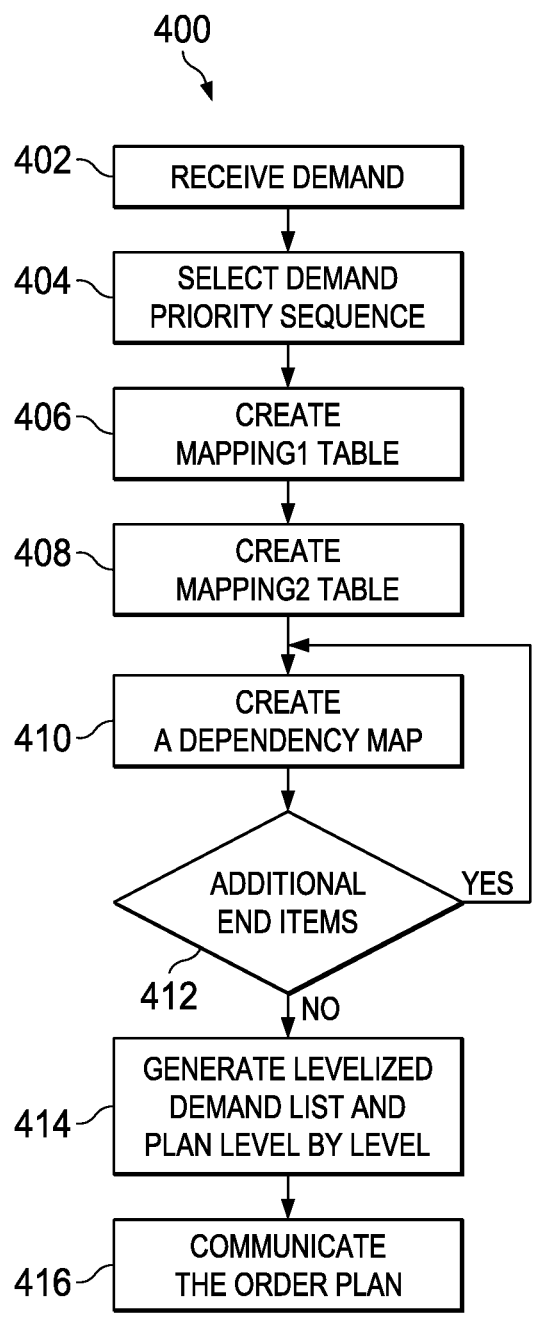
FIG. 4 illustrates an exemplary method of parallelizing order-by-order planning in a supply chain network.

FIG. 4 illustrates an exemplary method 400 of parallelizing order-by-order planning in a supply chain network. The method begins at step 402, where supply chain planner receives a demand according to a demand priority sequence. As discussed above, a demand priority sequence includes a number of demands for each end-item and is selected at step 404. In addition, as discussed above, supply chain planner 110 plans parallel order plans for the received demands without violating the demand priority sequence.

At step 406, supply chain planner 110 creates a mapping1 table which maps each end-item to its corresponding item and resource mapping. In addition, as discussed above, for each end-item, supply chain planner 110 accesses all items and resources in its corresponding supply path and updates mapping1 table in database 220. At step 408, supply chain planner 110 creates a mapping2 table which maps for each item and resource to their end-item mapping. In addition, as discussed above, for each item and resource, supply chain planner 110 accesses all end-items in its corresponding supply path and updates mapping2 table.

At step 410, supply chain planner 110 creates a dependency map between each end-item based on mapping1 and mapping2 tables. At step 412, supply chain planner 110 determines if there is another end-item. If there is another end-item, the method proceeds to step 410, otherwise, the method proceeds to step 414. At step 414, supply chain planner 110 sorts the received demands based on the demand priority and generates a list of demand levels. That is, each demand level includes multiple demands that can be processed in parallel. In addition, supply chain planner 110 processes the demand levels in the increasing order of the level. This ensures that the demand priority is respected (i.e., not violated) while planning the demands in parallel, in, for example, an interconnected supply chain.

At step 416, supply chain planner 110 communicates the generated order plan of end-items to be planned in parallel based on the received demands in order to satisfy the demand priority sequence, to one or more entities in system 100 and the method ends. In addition, although, FIG. 4 illustrates one embodiment of a method of parallelizing order-by-order planning in a supply chain network, various changes may be made to method 400 without departing from the scope of embodiments of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A supply chain system, comprising:
  a supply chain network comprising two or more supply chain entities, each supply chain entity configured to supply one or more items to satisfy demand;
  a supply chain planner comprising:
    a database that stores data describing a demand priority sequence, each demand priority sequence comprising at least one demand of an end-item; and
    a supply chain planning engine tangibly embodied on a non-transitory computer-readable medium coupled with the database that:
      accesses the data describing the demand priority sequence;
      accesses the data describing the supply chain network;
      creates mapping tables for each end-item;
      generates a dependency map for each end-item based on the mapping tables;
      generates a list of demand levels comprising two or more demands that can be planned in parallel processing levels; and
      generates an order plan of end-items for planning in parallel comprising the orders planned for the demands at each demand level, wherein the dependency map reduces the number of parallel processing levels by excluding related end-items of infinite material; and one of the two or more supply chain entities performs at least one operation to transform the one or more items into one or more end-items, based at least in part, on the generated order plan.

2. The supply chain system of claim 1, wherein the mapping tables comprise a first mapping table and wherein the supply chain planning engine further:
  for each end-item:
    accesses items in an end-item supply path;
    accesses resources in the end-item supply path; and
    updates the first mapping table with the accessed items and resources in the end-items supply path.

3. The supply chain system of claim 2, wherein the mapping tables comprise a second mapping table, wherein the supply chain planning engine further:
  for each item:
    accesses end-items in the item supply path; and
    updates the second mapping table with the accessed end-items in the items supply path; and
  for each resource:
    accesses end-items in the resource supply path; and
    updates the second mapping table with the accessed end-items in the resources supply path.

4. The supply chain system of claim 3, wherein generating the dependency map the supply chain planning engine further:
  for each end-item, accessing items and resources associated with the end-item from the first mapping table;
  for each item, accessing end-items associated with the item from the second mapping table;
  for each resource accessing end-items associated with the resource from the second mapping table; and
  for each end-item, updating the dependency map with each end-item associated with the item and resource as related end-items.

5. The supply chain system of claim 1, wherein the supply chain planning engine further computes a demand level of each demand of an end-item:
  for each demand of the end-item initialize each end-item with an initial demand level; and
  for each end item access other related end-items from the generated dependency map, wherein the demand level of each demand of an end-item is the maximum of the demand levels of the related end-items plus a predetermined value.

6. The supply chain system of claim 5, wherein the supply chain planning engine further:
  updates the computed demand level of each demand of an end-item with the computed demand level.

7. A computer-implemented method, comprising:
  accessing data describing a demand priority sequence, each demand priority sequence comprising at least one demand of an end-item;
  accessing data describing the supply chain network comprising two or more supply chain entities, each supply chain entity configured to supply one or more items to satisfy demand;
  creating mapping tables for each end-item;
  generating a dependency map for each end-item based on the mapping tables;
  generating a list of demand levels comprising two or more demands that can be planned in parallel processing levels;
  generating an order plan of end-items for planning in parallel comprising the orders planned for the demands at each demand level, wherein the dependency map reduces the number of parallel processing levels by excluding related end-items of infinite material; and causing at least one of the two or more supply chain entities to perform at least one operation to transform the one or more items into one or more end-items, based on the generated order plan.

8. The method of claim 7, wherein the mapping tables comprise a first mapping table comprising:
for each end-item:
accessing items in an end-item supply path;
accessing resources in the end-item supply path; and
updating the first mapping table with the accessed items and resources in the end-items supply path.

9. The method of claim 8, wherein the mapping tables comprise a second mapping table comprising:
for each item:
accessing end-items in the item supply path; and
updating the second mapping table with the accessed end-items in the items supply path; and
for each resource:
accessing end-items in the resource supply path; and
updating the second mapping table with the accessed end-items in the resources supply path.

10. The method of claim 9, wherein generating the dependency map further comprising:
for each end-item, accessing items and resources associated with the end-item from the first mapping table;
for each item, accessing end-items associated with the item from the second mapping table;
for each resource accessing end-items associated with the resource from the second mapping table; and
for each end-item, updating the dependency map with each end-item associated with the item and resource as related end-items.

11. The method of claim 7, further comprising;
computing a demand level of each demand of an end-item:
for each demand of the end-item, initializing each end-item with an initial demand level; and
for each end item, accessing other related end-items from the generated dependency map, wherein the demand level of each demand of an end-item is the maximum of the demand levels of the related end-items plus a predetermined value.

12. The method of claim 11, further comprising:
updating the computed demand level of each demand of an end-item with the computed demand level.

13. A non-transitory computer-readable medium embodied with software, the software when executed using one or more computers is configured to:
access data describing a demand priority sequence, each demand priority sequence comprising at least one demand of an end-item;
access data describing the supply chain network comprising two or more supply chain entities, each supply chain entity configured to supply one or more items to satisfy demand;
create mapping tables for each end-item;
generate a dependency map for each end-item based on the mapping tables, wherein the dependency map reduces the number of parallel processing levels;
generate a list of demand levels comprising two or more demands that can be planned in parallel processing levels;
generate an order plan of end-items for planning in parallel comprising the orders planned for the demands at each demand level, wherein the dependency map reduces the number of parallel processing levels by excluding related end-items of infinite material; and
perform at least one operation to transform the one or more items into one or more end-items, based at least in part, on the generated order plan.

14. The non-transitory computer-readable medium of claim 13, wherein the mapping tables comprise a first mapping table comprising:
for each end-item:
access items in an end-item supply path;
access resources in the end-item supply path; and
update the first mapping table with the accessed items and resources in the end-items supply path.

15. The non-transitory computer-readable medium of claim 14, wherein the mapping tables comprise a second mapping table comprising:
for each item:
access end-items in the item supply path; and
update the second mapping table with the accessed end-items in the items supply path; and
for each resource:
access end-items in the resource supply path; and
update the second mapping table with the accessed end-items in the resources supply path.

16. The non-transitory computer-readable medium of claim 15, wherein generating the dependency map further comprises:
for each end-item, access items and resources associated with the end-item from the first mapping table;
for each item, access end-items associated with the item from the second mapping table;
for each resource access end-items associated with the resource from the second mapping table; and
for each end-item, update the dependency map with each end-item associated with the item and resource as related end-items.

17. The non-transitory computer-readable medium of claim 13, wherein the software is further configured to:
compute a demand level of each demand of an end-item:
for each demand of the end-item, initialize each end-item with an initial demand level; and
for each end item, access other related end-items from the generated dependency map, wherein the demand level of each demand of an end-item is the maximum of the demand levels of the related end-items plus a predetermined value.

18. The non-transitory computer-readable medium of claim 17, wherein the software is further configured to:
update the computed demand level of each demand of an end-item with the computed demand level.

* * * * *

UNITED STATES PATENT AND TRADEMARK OFFICE
CERTIFICATE OF CORRECTION

PATENT NO. : 9,721,222 B2
APPLICATION NO. : 12/610548
DATED : August 1, 2017
INVENTOR(S) : Gayathri Chennimalai et al.

It is certified that error appears in the above-identified patent and that said Letters Patent is hereby corrected as shown below:

In the Specification

Column 7, Lines 41-45:
1. Please amend the paragraphs as indicated below:

The demand level for end-item 330a is computed as follows:
    Level=max(related end-items level)+I=max(-1,-1)+1 = -1+ 1=0
    Update end-item 330a level=0
    levelized_demand_list[0]=Demand for end-item 330a
The demand level for end-item 330b is computed as follows:
    Level=max(0,-1,-1 )+ 1 =0+ I =1
    Update end-item 330b level=1
    levelized_demand_list[1]=Demand for end-item 330b Signed and Sealed this
Third Day of April, 2018

Andrei Iancu
*Director of the United States Patent and Trademark Office*